(12) United States Patent
Cheng

(10) Patent No.: US 7,034,965 B2
(45) Date of Patent: Apr. 25, 2006

(54) METHOD AND SYSTEM FOR AUTOMATIC SCANNING SYSTEM

(76) Inventor: Stone Cheng, 187, Ping-Teng Rd., Tzu-Kuan Hsiang, Kaohsiung (TW)

( * ) Notice: Subject to any disclaimer, the term of this patent is extended or adjusted under 35 U.S.C. 154(b) by 912 days.

(21) Appl. No.: 09/977,847

(22) Filed: Oct. 16, 2001

(65) Prior Publication Data

US 2003/0072038 A1  Apr. 17, 2003

(51) Int. Cl.
*H04N 1/387* (2006.01)
(52) U.S. Cl. ............... 358/453; 358/474; 358/487
(58) Field of Classification Search ........... 358/448, 358/452, 453, 474, 487, 527
See application file for complete search history.

(56) References Cited

U.S. PATENT DOCUMENTS 4,837,635 A * 6/1989 Santos .................. 358/401
5,136,399 A * 8/1992 Aoyama ................ 358/296
6,256,117 B1 * 7/2001 Hsu et al. .............. 358/475

* cited by examiner

*Primary Examiner*—Thomas D. Lee
(74) *Attorney, Agent, or Firm*—Berkeley Law & Technology Group LLC (57) ABSTRACT

In accordance with the present invention, an operating procedure of a scanning system that can get images automatically is disclosed. The operating procedure comprises steps of scanning at least one original to get an image which can display all content of this original, displaying the image, receiving a portion of image that selected by the user, and outputting the selected image. The present invention can also extend to a scanning method for using a scanning system with one-scan-and-done feature and free of identifying original's attribute feature. And a scanning system with one-scan-and-done feature and free of identifying original's attribute feature.

19 Claims, 6 Drawing Sheets

METHOD AND SYSTEM FOR AUTOMATIC SCANNING SYSTEM

BACKGROUND OF THE INVENTION

1. Field of the Invention

The present invention generally relates to a method for scanning an original with one-scan-and-done feature and free of identifying original's attribute feature to get an image, and more particularly to a scanning method for providing users with what you see what you get (WYSWYG) feature, and a method of operation like a point and shoot camera.

2. Description of the Prior Art

Figure 1A:
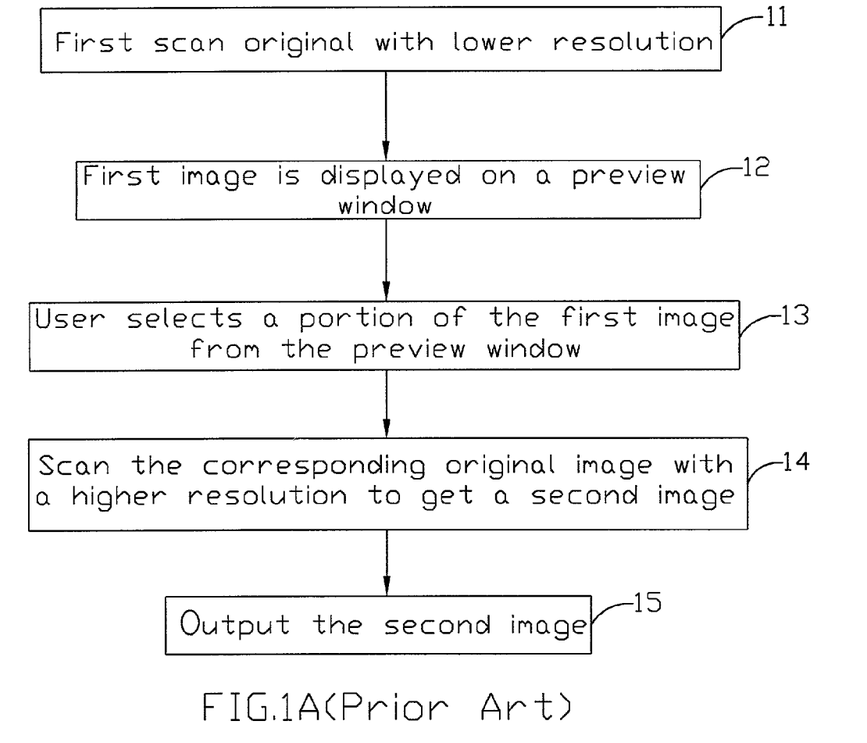
FIGS. 1A and 1B are diagrams of scanning procedure in the prior art.

The scanning procedure proposed in the prior art comprises basic steps described as steps 11–15 shown in FIG. 1A, first scan original with lower resolution, then the first image is displayed on a preview window. User selects a portion of the first image from the preview window. Then scan the corresponding original image with a higher resolution to get a second image, and output the second image.

Due to the resolution of first scan is lower than the second scan, the first image displayed on the preview screen is usually different the second image. Though an image is not obviously distorted by variation of resolution, the nature of image, such as color, brightness, spot, and edge of profile, is usually varied with the resolution resulting in the difference between the selected first image shown on the preview window and the output image (such as printed picture or saved file).

Furthermore, when an original is scanned by a scanner to get an image, the image processes such as bit enhanced process and color adjustment process is performed on the image to enhance the clarity and to promote the quality. Due to the different requirement for the first scan and the second scan, the distinction between the selected image shown on the preview window and the output image becomes obvious, especially when a scanner is designed to perform the image process only for the second scan. The image process described herein can be performed during scanning or after scan, and it is restricted to perform automatically, in other words, can't be adjusted by users.

Besides, the scanned original can be classified to reflective original and transparent original base on whether this original pervious to light. Due to the attributes of reflective original and transparent original are different, when scan the reflective original must use the reflective scanning mode, vice versa, scan the transparent original must use the transparent scanning mode, besides the reflective scanning mode can't recognize the reflective original, and the transparent scanning mode can't recognize the transparent original, too.

Figure 1B:
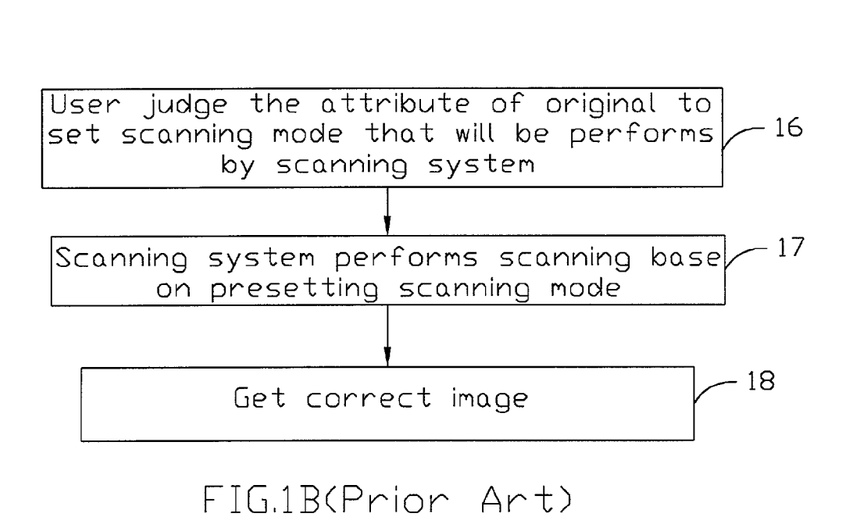

Due to the existing scanning systems can't recognized the reflective and transparent original in the same time, users need to know the attributes of scanned original and setting it appropriately to get the correct image before scanning, as steps 16–18 shown in FIG. 1B. If the scanning mode of scan system (like scanner) didn't match the type of scanned original. For example, scanned the reflective original with transparent scanning mode, then a result of scanning can't displayed the content of scanned original completely.

In view of the prior art described above, there are non-neglect differences between the image displayed on the preview window and the output image, that is what a user sees on the preview window is different from what the user think he will get, and users also need to preset the attribute of the scanned original. Thus, it is necessary to modify the conventional scanning method to provide users with what you see what you get feature, and to simplify overall scanning process.

SUMMARY OF THE INVENTION

In accordance with the present invention, a scanning method and a scanning system for providing users with what you see what you get feature and simplify the scanning process for users to manipulate are provided.

It is another object of this invention that a scanning method and a scanning system with one-scan-and-done feature and without preset the attribute of the scanned original are provided.

In accordance with the present invention, an operating procedure of a scanning system with get image automatically. The operating procedure comprises steps of scanning an original and get an image which at least can displayed all content of this original, then displayed the image, receiving a portion of the image selected by the user, and outputting the selected image.

In accordance with the present invention, in another embodiment, a method for using a scanning system with one-scan-and-done feature and free of identifying original's attribute is provided. The method comprises steps of scanning an original and get an image which at least can displayed all content of this original, and selected a portion of the image and allow to adjust the portion of image, and output the selected image from scanning system.

In accordance with the present invention, in a further embodiment, a scanning system with one-scan-and-done feature and free of identifying original's attribute is provided. The scanning system comprises a scanning module, process module, storage module, display module, receiving module and output module. The scanning module is for scanning an original to get an image that at least can display all of content of this original. The process module is for processing image that scanned by scanning module. The storage module is for storing an image that generated by processing module. The display module is for displaying an image that generated by processing module. The receiving module is for receiving a portion of image that selected by user, and receiving commands that used to modify an image sent from user, and sending it to process module, so as to modifying a portion of image and storing in storage module after modified. The output module is for outputting an image that storing in storage module directly.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

The drawbacks of the prior art are mostly induced from the different resolutions between the first scan and the second scan and the implementation of the image process in the second scan, moreover, can't scan reflective and transparent original in the same time, and need user to preset the attribute of scanned original before scanning. Thus, the key aspect of the present invention is to scan an original with a resolution requested by users and to accomplish the implementation of the image process to generate a processed image with desired resolution, which is displayed on a preview window. Then, a portion of the processed image is selected and output directly without taking other scanning actions to ensure the output image is the processed image selected by users.

Another key aspect of the present invention is the scan system can performed original scanning with both modes automatically, and then integrated images of reflective original and transparent original to get a preview window which can displayed all content of scanned original. Just like a point and shoot camera, therefore, user doesn't need to preset the scanning mode before scanning to prevent get incorrect image, and made user's operation to simplify.

Figure 2A:
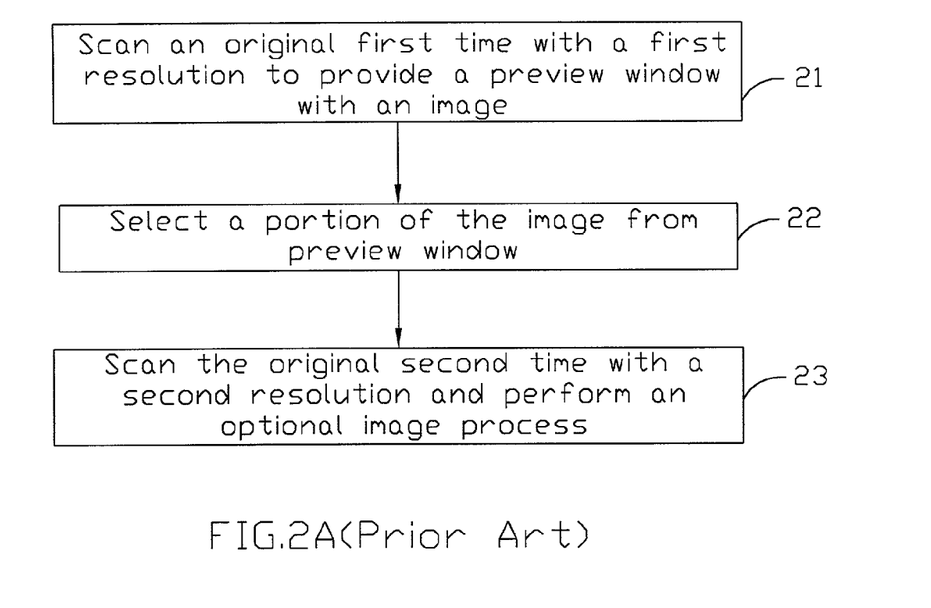
FIGS. 2A and 2B are flow diagrams of a conventional scanning method and a scanning method with doesn't need to scan twice feature in accordance, respectively.
Figure 2B:
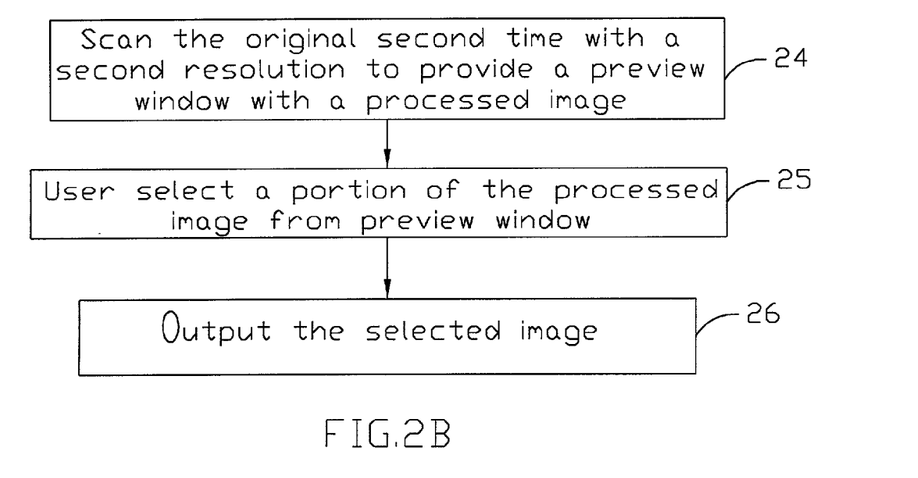

For example, referring to FIG. 2A and FIG. 2B, a conventional scanning method includes steps 21, 22, and 23 while the scanning method in accordance with the present invention comprises steps 24, 25, and 26. A conventional scanning method includes steps of scanning an original first time with a first resolution to provide a preview window with an image (step 21), selecting a portion of the image from the preview window (step 22), and scanning the original second time with a second resolution and performing an optional image process to get a processed image (step 23). In comparison with the conventional method, the present invention comprises steps of directly scanning the original with the second resolution and performing an optional image process to provide a preview window with a processed image (step 24), selecting a portion of the processed image (step 25), and outputting the selected image (step 26).

Apparently, the present invention combines the first scan and the second scan to perform only one scan to generate the preview window. There is no second scan performed after the processed image is selected. Thus, the image shown on the preview window or the processed image selected is what user gets of the output image. In other words, the present invention provides users with what you see what you get feature unless the resolution of screen is too low to precisely display preview window.

Moreover, due to the first resolution and the second resolution are input by users in the prior art, there is no difficulty in implementing the present invent. The resolution (the second resolution) used to scan an original can be input by users depending on personal experience and the image wish to get. Thus, the desired image is acquired by use of the resolution in one scan of the original.

Figure 3A:
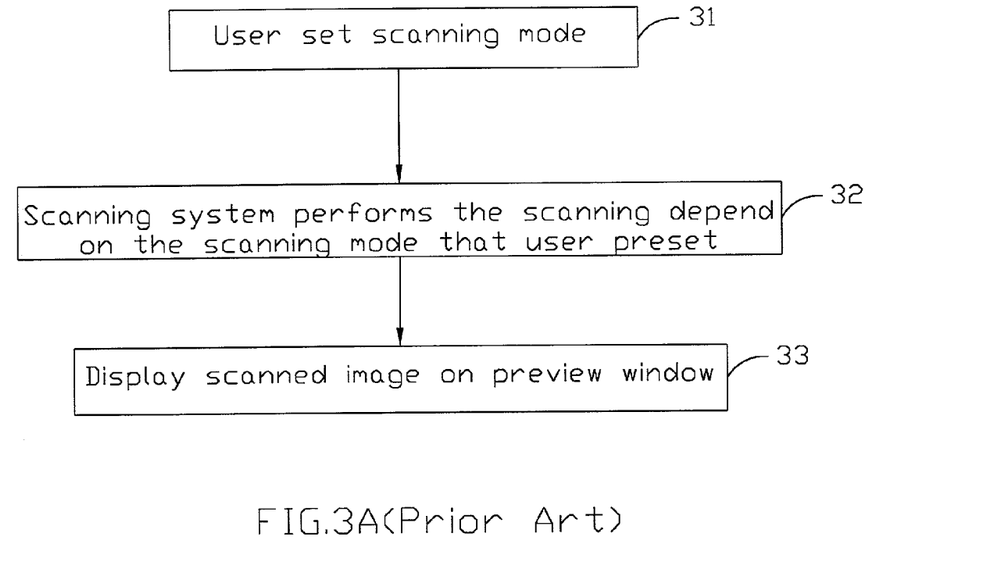
FIGS. 3A and 3B are flow diagrams of a conventional scanning method and a scanning method with doesn't need to decide the attribute of original in advance feature, respectively.
Figure 3B:
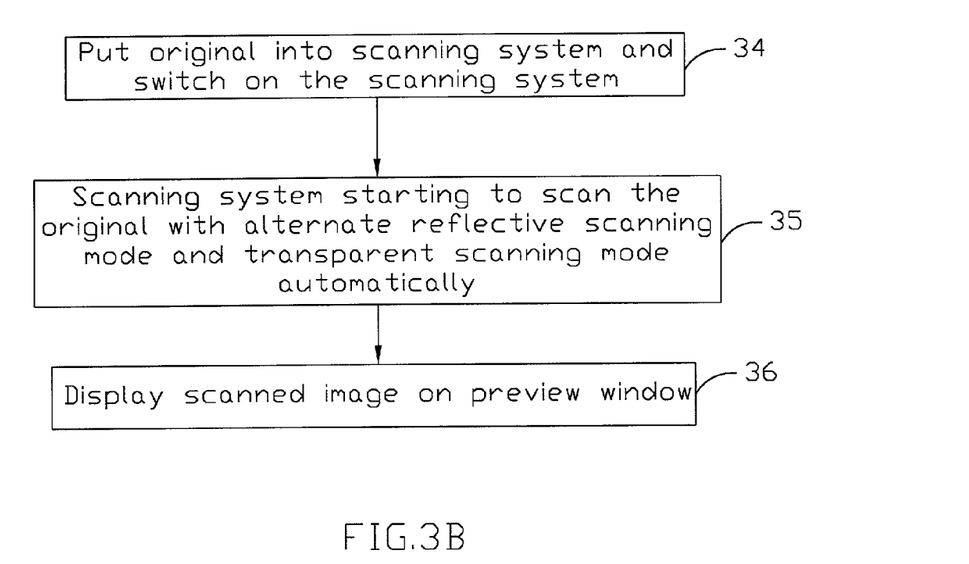

Besides, as shown in FIG. 3A and FIG. 3B, a conventional scanning method includes steps 31, 32, and 33 while the scanning method in accordance with the present invention comprises steps 34, 35, and 36. A conventional scanning method is when user wants to scan some kind of originals (like reflective original), the scan system will perform the scanning (step 32) depending on the scanning mode that user preset (like reflective scanning mode) (step 31), and then display scanned image on preview window (step 33). In comparison with the conventional method, the present invention comprises steps of put the original into scan system and switching on scan system (step 34), and then scan system starting to scan this reflective original with alternate reflective scanning mode and transparent scanning mode automatically (step 35), and displayed all content of this reflective original in preview window.

Certainly, not all of scanned originals (or many originals want scanned together, or some originals mixed both reflective and transparent original in one original) mingle both reflective and transparent original, or not necessary use reflective scanning mode and transparent scanning mode in each scanning. Thus, the present invention can be changed as following: scan an original with one of scanning mode first, and then analyzed whether can identify the content of original from scanned data. If it can't be identified then scan again with another scanning mode. On the contrary, if it can be identified then drawing preview image according to these data, and don't need scan again with another scanning mode.

Additionally, the image shown on the preview window is pre-processed by performing an image process (such as bit enhanced technology) to not only prevent the image on the preview window different form the output image, but also let users select the process mode and parameters used in the image process before the scan is performed. In comparison with the prior art that the image process is automatically performed, the present invention provides users more flexible applications.

It is noted that one of the reasons to perform a first scan with lower resolution and a second scan with a higher resolution, and user needs to set the scanning mode, but can't perform scanning with alternate reflective scanning mode and transparent scanning mode automatically in the prior art is because the hardware performance is limited to the scan speed of a scanner or the capacity of storing the image in a storage media. As the performance of commercial hardware products continuously progressing, today the scanning rate of scanner is faster then the past, besides the capacity and access rate of storage media are also bigger and faster then past. The limitation of hard ware is not an issue anymore. In accordance with the present invention, though the scanning method consumes more scanning time in one scan and requires larger storage capacity, the application of the present invention is feasible.

In accordance with the present invention, in one embodiment, an operating procedure of a scanning system without scanning twice feature and doesn't need preset the attribute of original before scanning to get image automatically are disclosed. The present invention is described in view of the operating procedure of the scanning system in the embodiment. The operating procedure comprises blocks 41, 42, 43, 44, and 45 depicted in FIG. 4, block 41 and block 45 can be in place of each other, but block 41–44 are necessary.

Figure 4:
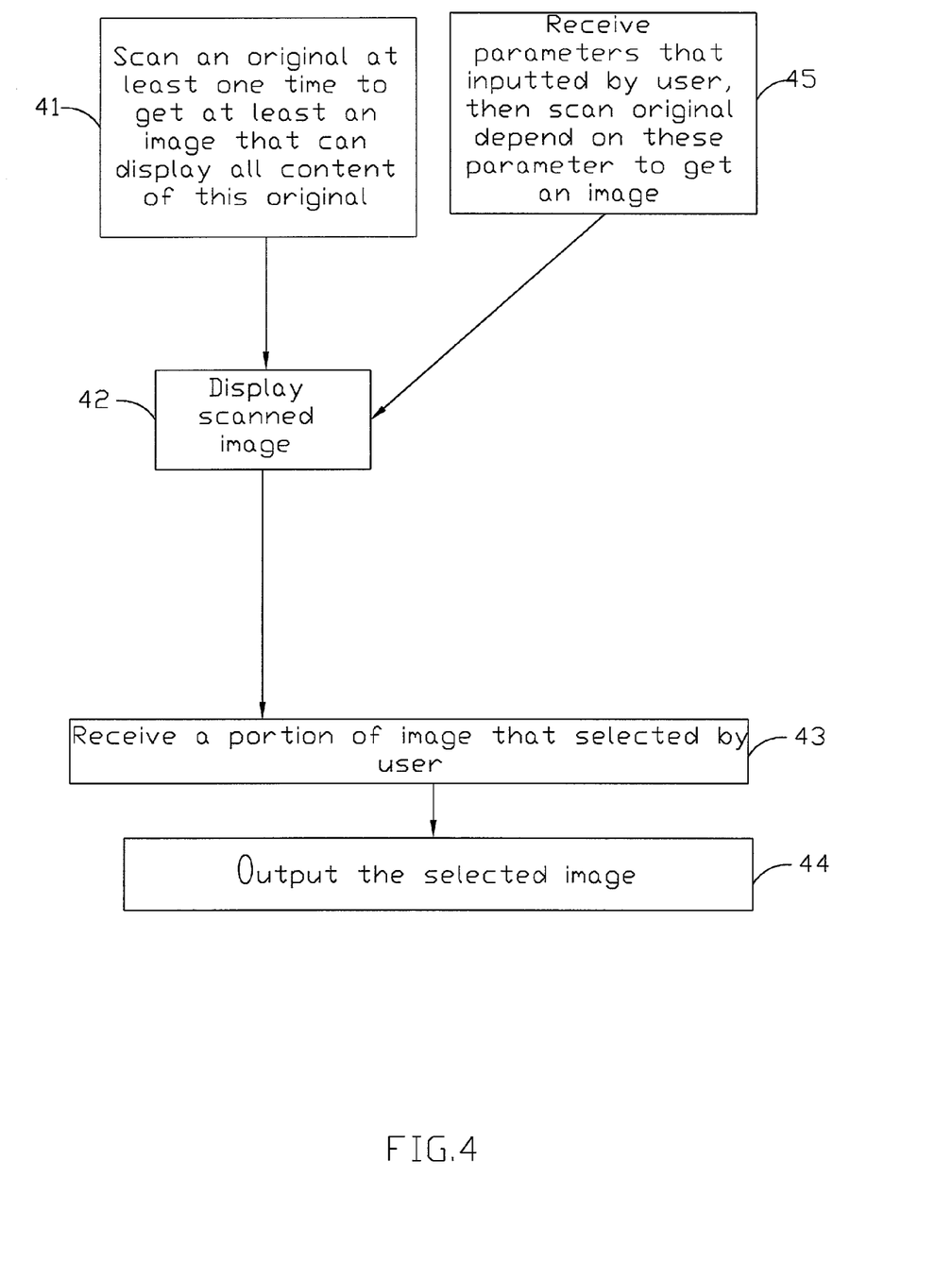
FIG. 4 is an operating procedure in one embodiment.

As shown in FIG. 41, scan an original at least one time to get at least an image that can display all content of this original.

Due to originals probably are reflective original, transparent original, or mix of both, and didn't receive any information about attribute of original from users input. Thus the embodiment is using a reflective scanning mode and a transparent scanning mode to scan original. As for which mode performs first is not point in the embodiment.

Additionally, according to selected mode of scanning and variation relation of received image, the embodiment has many varieties described as following:

First, in accordance with the present invention can scan original with reflective scanning mode, and then analyzed receiving data to get an image of reflective original. If the image of reflective original can't display all content of original, then scan original again with transparent scanning mode. Relatively if the reflective original image can display all content of original then won't using transparent scanning mode to scan again, but display reflective original image directly.

Of course, in accordance with the present invention also can scan original with transparent scanning mode, and then analyzed receiving data to get an image of transparent original. If the image of transparent original can't display all content of original, then scan original again with reflective scanning mode. Relatively if the transparent original image can display all content of original then won't using reflective scanning mode to scan again, but display transparent original image directly.

Additionally, after scanning original, still can performed the image process on the image, the image process can be any technology to increase the accuracy and the clarity of the image, such as Bit Enhancement Process disclosed in U.S. Pat. No. 5,818,973.

Additionally, the image process can be either performed by a scanner or by a computer. The image process can be modified, replaced, and upgraded by external technologies when a computer is utilized. In comparison with the prior art that the image process is performed by a scanner, wherein the image process is fixed when the scanner is once built, the present invention utilizes a computer that is by replacing the software the image process is upgraded. Thus, the present invention can promote the flexibility in utilizing the scanner and extend the performance of the scanner.

As depicted in display block 42, display an image that gets after scanning, herein the image is usually displayed on a screen. The selection or treatment of the image is also handled on the screen. Thus, the performance of what you see what you get feature provided by the present invention is diminished if the resolution of the screen is too low.

Herein, preview window usually displayed reflective original image and transparent original image separately when those images included at least one reflective original image and transparent original image. Certainly, preview window can displayed the image that combined both reflective original image and transparent original image, and if any portion of image can't display by transparent image then will instead by reflective image on preview window, on the other hand, any portion of image can't display by reflective image then will instead by transparent image on preview window.

Referring to receiving block 43, a portion of the image selected by the user is received. It is noted that after the selection of image, a further adjustment of the selected image is achievable.

The selected image is output as depicted in block 44. Output the image which through selection and adjustment directly, and didn't perform any scanning again.

Of course, as shown in block 45, in accordance with the present invention can received a parameter that inputted by user, and then scan original base on these parameter to get an image. These parameters at least include the scanning resolution, but won't be any information about originals whether reflective original or transparent original.

In accordance with the present invention, in another embodiment, a method for using a scanning system with one-scan and-done feature and didn't pre-decide the attribute of original are provided. The present invention is described in view of using the scanning system in the embodiment. The method comprises steps 51–55 illustrated in FIG. 5, where in the block 55 can be executed or not, but block 51–54 are necessary.

Figure 5:
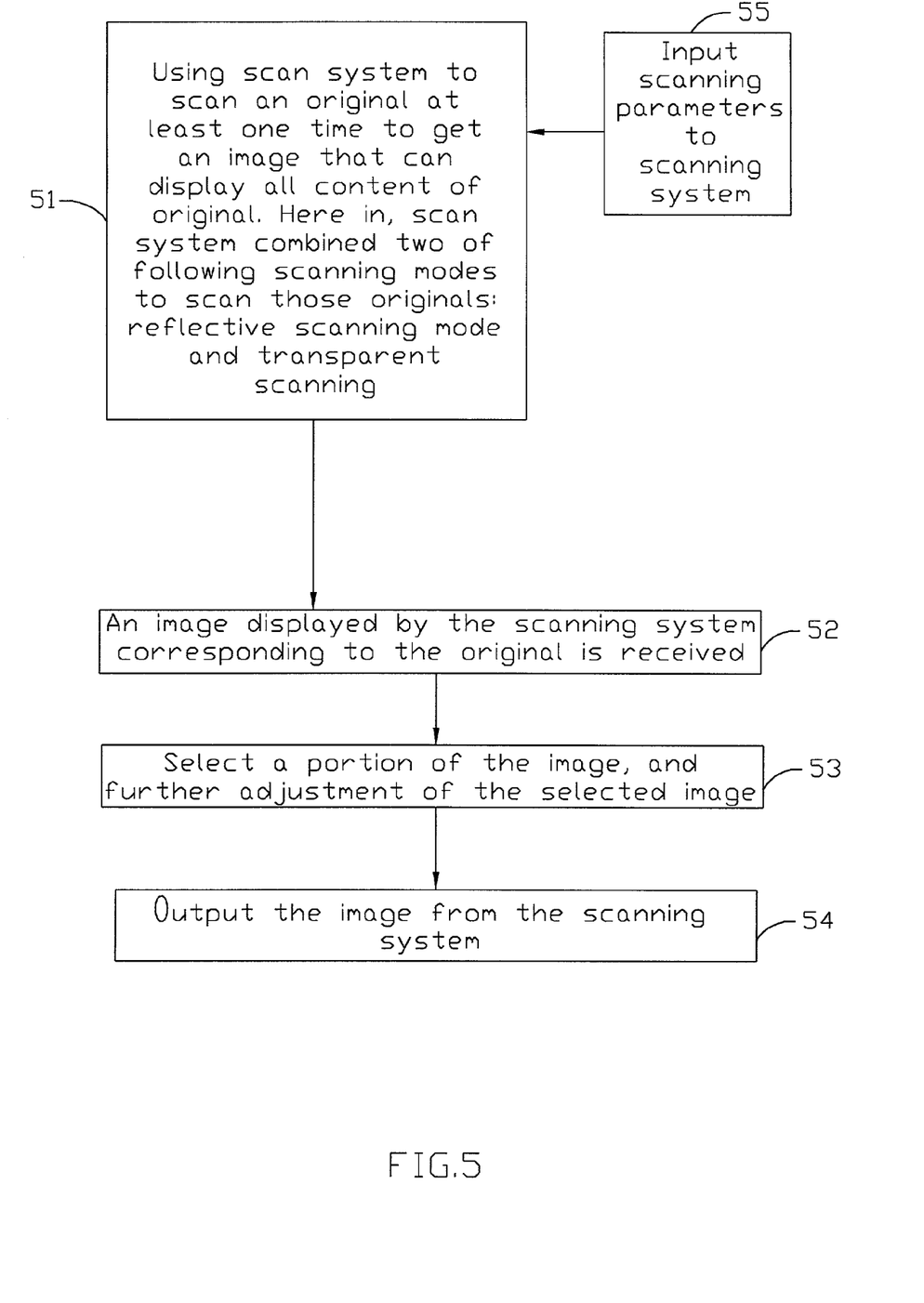
FIG. 5 is an operating procedure in another embodiment.

As shown in block 51, using scan system to scan an original at least one time to get an image that can display all content of original. Here in, scan system combined two of following scanning modes to scan those originals: reflective scanning mode and transparent scanning mode, as to which mode first is not point in the present invention. If the scan system can get image which enough to display most content of scanned original using one scanning mode, and then the scan system won't perform scanning again with another scanning mode.

As shown in receiving block 52, an image displayed by the scanning system corresponding to the original is received. The image is usually displayed on a screen. The selection or treatment of the image is also handled on the screen. Thus, the performance of what you see what you get feature provided by the present invention is diminished if the resolution of the screen is too low.

A portion of the image is selected, as depicted in processing block 53. It is noted that after the selection of image, a further adjustment of the selected image is achievable. The selected image is output from the scanning system, as illustrated in block 54.

Certainly, the present invention can execute block 55 that used to input scanning parameters to scan system before executed block 51, the varieties of scanning parameters include the scanning resolution, and image process command that use to process the scanned image with image process procedure before display the image, but scanning parameters won't include any information about the attribute of original. Herein, the image process can be any technology to increase the accuracy and the clarity of the image, such as Bit Enhancement Process.

Additionally, the image process can be either performed by a scanner or by a computer. The image process can be modified, replaced, and upgraded by external technologies when a computer is utilized. In comparison with the prior art that the image process is performed by a scanner, wherein the image process is fixed when the scanner is once built, the present invention utilizes a computer that is by replacing the software the image process is upgraded.

Figure 6A:
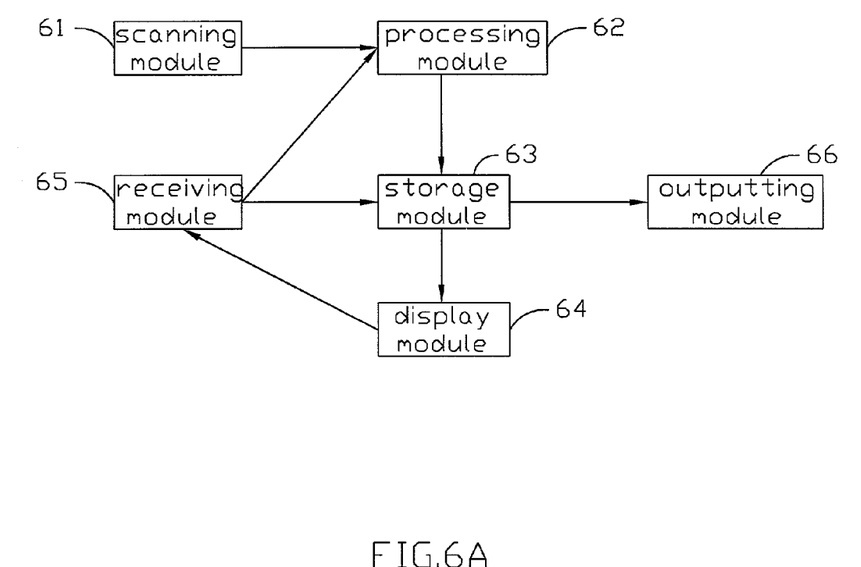
FIGS. 6A and 6B are the schematic structures in a further embodiment.

In accordance with the present invention, in a further embodiment, a scanning system with one-scan-and done feature and didn't pre-decide attribute of original are provided. The present invention is described in view of the structure of the scanning system in the embodiment. The scanning system comprises units of scanning module 61, process module 62, storage module 63, display module 64, receiving module 65, and output module 66 in FIG. 6.

The scanning module 61 is for scanning an original to get an image that can display all content of original. The process module 62 is for processing the image that scanned by module 61. The storage module 63 is for storing images that processed by module 62. The display module 64 is for displaying images that processed by module 62. The receiving module 65 is for receiving a portion of image that selected by user, and receiving the image process command form user, furthermore passing commands to process module 62 to modify the portion of selected image by user, and storing image in storage module 63 after modified. The output module is for outputting images that stored in module 62.

Simply, the scanning system is similar to that in the prior art. The key difference is the scanning module 61 and outputting module 65. The scanning module 61 uses both reflective scanning mode and transparent scanning mode to scan each original automatically, and without user input the scanning mode and attribute of original.

Additionally, outputting module 66 output the image directly according to user's selection and process on display module 64, and won't perform scanning again to update the image with module 61.

Figure 6B:
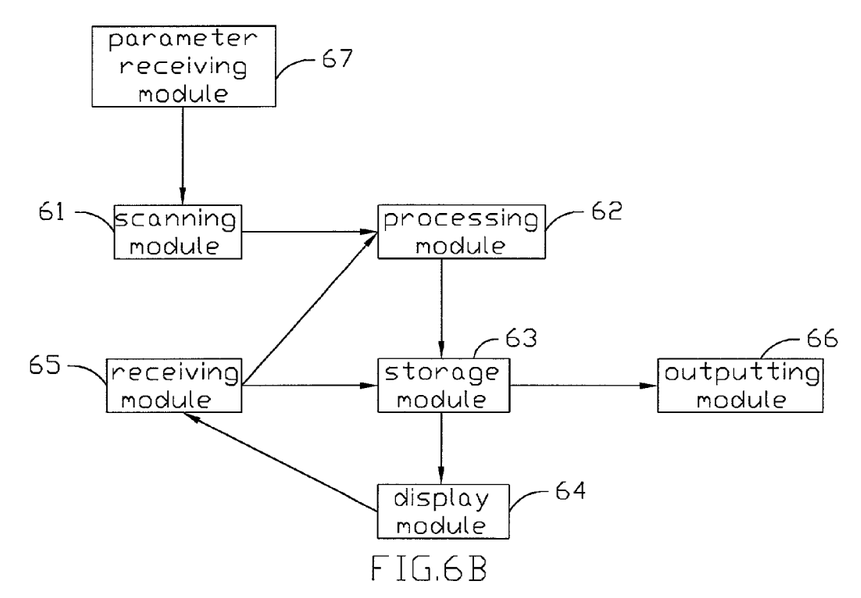

Besides, as shown in FIG. 6B, the present invention can include receiving parameter module 67, it is for receiving parameters input by a user and passing parameters to scanning module 61, and then scanning module scan original base on these parameters.

In view of embodiments described above, in accordance with the present invention, a scanning method and a scanning system for providing users with what you see what you get feature and an operation method similar to a point and shoot camera are provided. The operating procedure is simplified, only one scan is possible with the one-scan-and-done feature. Furthermore, the resolution for scanning is input by users, the way of scanning performed by the scanner is unchanged, and the image process can be similar to that in prior art, thus, there is no need to change the hardware in use. Thus, in accordance with the present invention, the scanning method to provide users with what you see what you get feature is achievable with only one scan.

Although specific embodiments have been illustrated and described, it will be obvious to those skilled in the art that various modifications may be made without departing from what is intended to be limited solely by the appended claims.

What is claimed is:

1. An operating procedure of a scanning system which gets an image automatically, said operating procedure comprising:
    scanning an original to get an image, wherein said image displays content of said original;
    displaying said image, wherein said image comprises a reflective image and a transparent image, wherein said reflective image and said transparent image are combinable to be displayed in a preview window, wherein a portion of said original not represented by said transparent image is substituted by said reflective image, wherein a portion of said original not represented by said reflective image is substituted by said transparent image;
    receiving a portion of said image which is selected by the user;
    and outputting said portion of said image which is selected by the user.

2. The operating procedure according to claim 1, further comprising:
    receiving a scanning parameter;
    and scanning said original based at least in part on said scanning parameter to get said image.

3. The operating procedure according to claim 2, wherein said scanning parameter comprises a resolution for scanning said original.

4. The operating procedure according to claim 1, wherein a reflective scanning mode and a transparent scanning mode both are used to scan said original.

5. The operating procedure according to claim 1, further comprising: scanning said original with a reflective scanning mode to get a reflective image;
    analyzing said reflective image;
    and scanning said original with a transparent scanning mode to get a transparent image, said reflective image representing a portion of said original.

6. The operating procedure according to claim 1, further comprising:
    scanning said original with a reflective scanning mode to get a reflective image;
    analyzing said reflective image; and
    displaying said reflective image directly, said reflective image representing content of said original.

7. The operating procedure according to claim 1, further comprising:
    scanning said original with a transparent scanning mode to get a transparent image;
    analyzing said transparent image; and
    scanning said original with a reflective scanning mode to get a reflective image, said transparent image representing a portion of said original.

8. The operating procedure according to claim 1, further comprising:
    scanning said original with a transparent scanning mode to get a transparent image;
    analyzing said transparent image; and
    displaying said transparent image directly, said transparent image representing content of said original.

9. The operating procedure according to claim 1, wherein said image includes a reflective image and a transparent image, a preview window to display said reflective image and said transparent image separately.

10. The operating procedure according to claim 1, further comprising:
    scanning an original to get an image; and
    executing an image processing procedure to treat said image before displaying said image.

11. The operating procedure according to claim 10, wherein said image processing procedure can be modified, replaced, or upgraded by the user.

12. The operating procedure according to claim 1, further comprising:
    modifying said portion of said image which is selected by the user; and
    outputting said image after said modifying.

13. A method for using a scanning system with one-scan-and-done feature and free of identifying original's attribute, said method comprising:
    using a scanning system to scan an original to get an image;
    receiving said image representing content of said original, wherein said image comprises a reflective image and a transparent image, wherein said reflective image and said transparent image are combined to be displayed in a preview window, wherein a portion of said original not represented by said transparent image is substituted by said reflective image, wherein a portion of said original not represented by said reflective image is substituted by said transparent image;
    selecting a portion of said image;

modifying said portion of said image; and outputting said portion of said image.

14. The operating procedure according to claim 13, wherein said scanning system performs scanning based at least in part on a scanning parameter input by a user.

15. The operating procedure according to claim 14, wherein said scanning parameter includes an image process command to execute an image process procedure after said original is scanned, and before said image is displayed.

16. The operating procedure according to claim 13, wherein said scanning system performs scanning with both a reflective scanning mode and a transparent scanning mode.

17. The operating procedure according to claim 16, while said scanning system performs scanning to get said image representing content of said original with one of said scanning modes, said scanning system not performing scanning again with another scanning mode.

18. A scanning system with one-scan-and-done feature and free of identifying original's attribute, said scanning system comprising:

a scanning module for scanning an original to get an image to display content of said original;

a processing module for processing said image scanned by said scanning module;

a storing module for storing said image, wherein said image comprises a reflective image and a transparent image, wherein said reflective image and said transparent image are combinable to be displayed in a preview window, wherein a portion of said original not represented by said transparent image is substituted by said reflective image, wherein a portion of said original not represented by said reflective image is substituted by said transparent image;

a displaying module for displaying said image;

a receiving module for receiving a portion of said image which is selected by the user, and also receiving an image-modification command which is sent by the user and used to modify said image, said image-modification command to be sent to said processing module to modify said image, and using said storing module to store said image after modification; and     an outputting module for outputting at least in part said image stored in said storing module.

19. The scanning system according to claim 18, further including:

a receiving module for receiving a scanning parameter from the user, and passing said scanning parameter to said scanning module, said scanning module to perform scanning based at least in part on said scanning parameter.

* * * * *